O. HAMMERSTEIN.

CIGAR MAKER'S APPARATUS.

APPLICATION FILED JULY 28, 1916.

1,285,137.

Patented Nov. 19, 1918.

2 SHEETS—SHEET 1.

WITNESSES

George Du Boy

John A Kehlenbeck

INVENTOR

Oscar Hammerstein

BY

Borresen & Schrenk

ATTORNEYS

O. HAMMERSTEIN.

CIGAR MAKER'S APPARATUS.

APPLICATION FILED JULY 28, 1916.

1,285,137.

Patented Nov. 19, 1918.

2 SHEETS—SHEET 2.

WITNESSES

George Du Bois

John A Kehlenbeck.

INVENTOR

Oscar Hammerstein

BY

Breisen & Schrenk

ATTORNEYS

THE NORRIS PETERS CO., PHOTO-LITHO., WASHINGTON, D. C.

UNITED STATES PATENT OFFICE.

OSCAR HAMMERSTEIN, OF NEW YORK, N. Y.

CIGAR-MAKER'S APPARATUS.

1,285,137. Specification of Letters Patent. Patented Nov. 19, 1918.

Application filed July 28, 1916. Serial No. 111,767.

*To all whom it may concern:*

Be it known that I, OSCAR HAMMERSTEIN, a citizen of the United States, and resident of the borough of Manhattan, city, county, and State of New York, have invented a certain new and useful Improvement in Cigar-Maker's Apparatus, of which the following is a specification.

My invention relates to cigar maker's apparatus and has for its object to provide a simple and compact arrangement including an improved and novel suction device whereby the wrapper is efficiently held, in combination with an improved wrapper cutting mechanism. My improvement further contemplates constructing the apparatus in such a manner that it may be also used as a cigar rolling table. My invention will be fully described hereinafter and the features of novelty will be pointed out in the appended claims.

Figure 1:
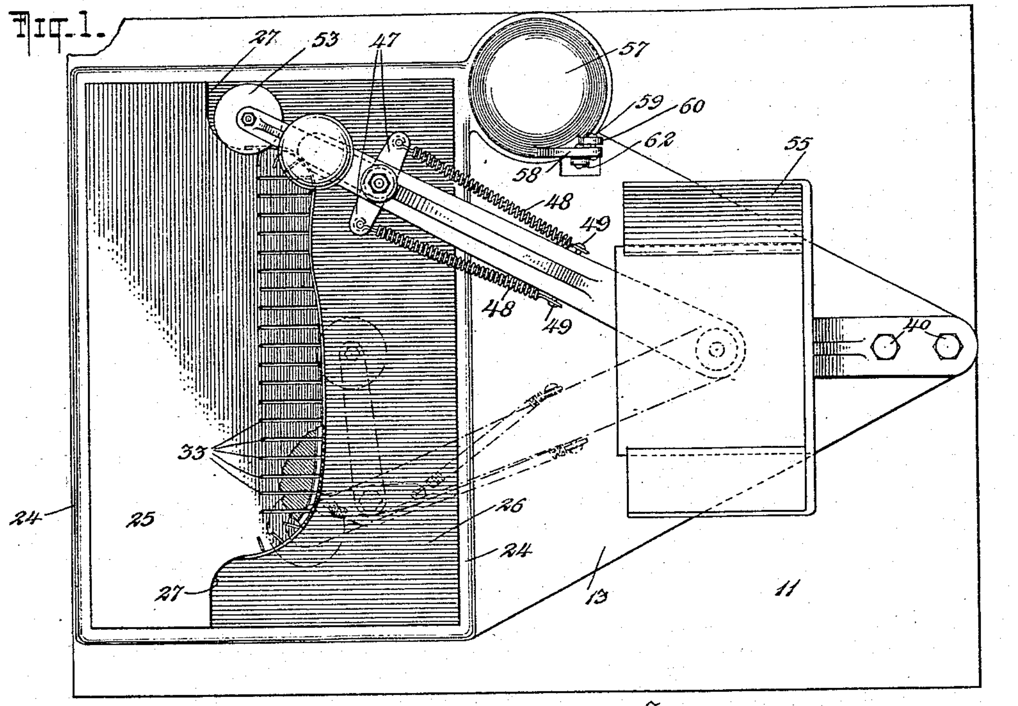
Figure 2:
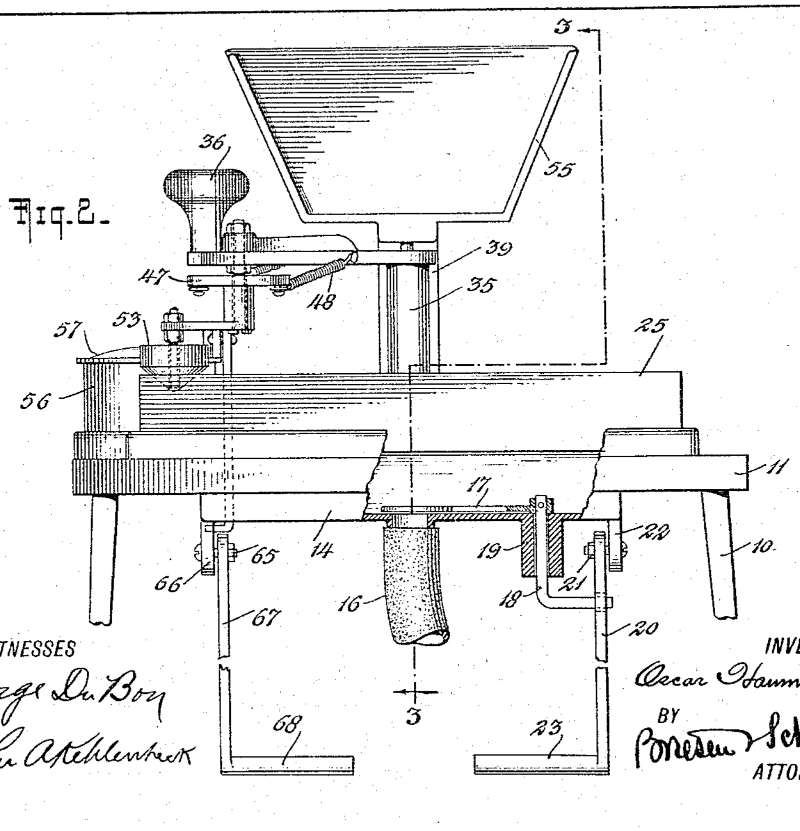
Figures 3, 4:
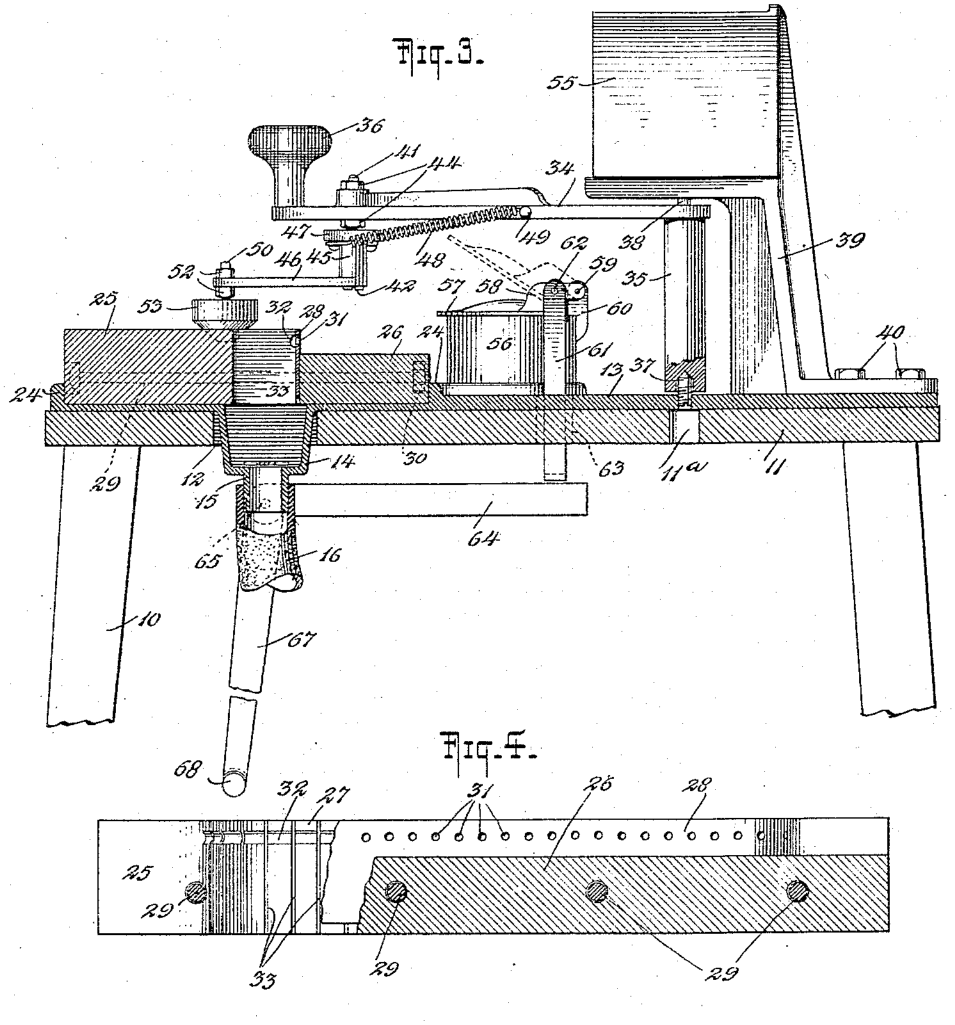
Figure 5:
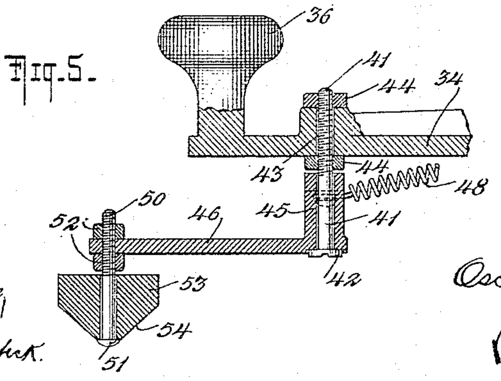

Reference is to be had to the accompanying drawings which illustrate an example of my invention and in which Figure 1 is a plan view of my improved apparatus partly in section; Fig. 2 is a front elevation thereof partly in section; Fig. 3 is a sectional elevation on the line 3—3 of Fig. 2; Fig. 4 is an elevation partly in section and partly broken away, of the suction table forming part of my improvement; and Fig. 5 is a detail sectional elevation of an element of the cutting mechanism.

As shown in Figs. 1, 2 and 3 of the illustrated examples the apparatus comprises a support 10 which may be of any suitable construction and is preferably provided with a top 11 having an opening 12 extending transversely therethrough as shown in Fig. 3. The top 11 supports a plate 13 which may be of metal and which is preferably secured to the top in any convenient manner, said plate being constructed with a depending trough 14 upwardly open and located in the opening 12 as shown in Fig. 3. This trough 14 at any convenient point is provided with a tubular neck 15 adapted to receive the one end of a flexible hose or other tube 16 whereby said trough is connected with any well known type of suction producing mechanism. A valve 17 is located in said trough 14 for controlling the connection with the suction producing means and as shown is carried by an angle rod 18 rotatably mounted in a boss 19 depending from the trough and operatively connected with a lever 20 as shown in Fig. 2. The lever 20 has its one end pivotally connected at 21 with a lug 22 forming part of said trough 14 and extends downwardly therefrom into close proximity to the floor on which the support 10 stands, the lower end of said lever 20 being provided with a treadle or foot piece 23.

The plate 13 is further formed with a continuous flange 24 which forms a recess in the upper surface thereof adapted to receive and accommodate the combined suction table and rolling board as shown in Figs. 1 and 3. The said suction table and rolling board snugly fits the recess formed by said flange 24 and if desired may be fastened therein by any additional securing means and comprises a front section 25 and an independent rear section 26. The front section 25 is somewhat higher than the rear section as shown in Fig. 3 to form at an intermediate point of the table, an edge wall 27 which is shaped or curved for instance as shown in Fig. 1, the opposed edge wall of the rear section 26 being shaped to fit the same as also illustrated in said figure. A strip or sheet of flexible steel or other metal 28 is located in surface contact with the edge wall 27 of the front section and has its upper edge in substantial registry with the upper surface of said front section 25, said plate 28 extending downwardly and being clamped between the sections 25 and 26 as shown in Fig. 3. The two sections 25 and 26 are detachably secured together for instance by bolts 29 which pass through said sections and receive nuts 30, the heads of the bolts and the nuts being preferably countersunk as shown by dotted lines in Fig. 3. It will be apparent, as the nuts 30 are screwed home on the bolts 29, that the two sections 25 and 26 will be drawn together and that the strip or sheet of metal 28 will be caused to conform to the shape of the edge wall 27 and be firmly clamped in position by said sections 25 and 26 so that in practice the two sections and the strip of metal are combined in the form of a unit. Near its upper edge the said strip or sheet of metal 28 is provided with a series of apertures 31 which communicate with a groove or recess 32 formed in the edge wall 27 and extending lengthwise thereof as shown in Figs. 1 and 3, said groove 32 in turn communicating with a series of slits or other openings 33 extending through the section 25 and terminating respectively at the upper and lower surfaces thereof. The said slits 33 also extend to the edge wall 27 of said section and at those portions above and below the groove 32 are sealed by the strip 28 and rear section 26. In the operative condition of the apparatus the series of slits 33 are located in registry with the upwardly open trough 14 and thus all communicate with said trough as shown in Fig. 3.

The apparatus further includes an arm 34 rigidly carried at one end by a stem 35 and provided at its opposite end with an operating handle 36 for manipulating said arm as will be more fully described hereinafter. The stem 35 is rotatably mounted between an adjustable screw 37 carried by the plate 13 and a lug 38 located in axial alinement with said screw 37 and depending from a bracket 39 secured to the plate 13 for instance by means of bolts 40. With this arrangement the arm 34 is capable of a swinging movement across the lower rear section 26 in a horizontal plane or in a direction parallel with the plate 13, it being understood that the top 11 may be formed with an aperture 11ᵃ in registry with the screw 37 and whereby access to said screw for adjustment purposes is readily possible. Near its forward end the arm 34 carries a depending rod or screw 41 having a head 42 at its free end and its other end extending through an opening 43 in said arm, said screw or rod being secured against unintentional displacement for instance by means of lock nuts 44 as shown in Fig. 5. A sleeve 45 is journaled upon said screw or rod 41 and is rotatably supported thereon against an axial movement in a downward direction by means of the head 42, said sleeve 45 forming an integral part of or being rigidly connected to a member 46 which extends parallel with the arm 34 and in its normal position projects forwardly beyond the free end thereof. The sleeve 45 is further provided with lugs 47 which extend in diametrically opposite directions therefrom as shown in Fig. 1 and are connected with one end of springs 48 the other ends of which are secured to projections 49 located at opposite sides of the arm 34. In practice the tension of said springs is equalized whereby said member 46 is normally maintained in a central position in which it extends in the same general direction as said arm 34. At its free end the member 46 carries a depending screw 50 having a head 51 and secured against unintentional displacement by means of lock nuts 52 as shown in Fig. 5, said screw 50 serving as a support for a roller 53 which is rotatably mounted thereon and is held against downward movement relatively to said screw 50 by the head 51. The roller 53 is downwardly tapered as indicated at 54 and is so located as to bring this tapered portion 54 into contact with the upper edge of the metal strip 28 and the section 25, the parts being all proportioned and arranged to secure this result as shown in Figs. 1, 2 and 3. If desired the bracket 39 may be constructed with a container arranged to hold a supply of tobacco leaf or the like.

In addition to the parts so far described the apparatus may further include a paste receptacle 56 which may form an integral part of or be suitably secured to the plate 13 in a position of easy accessibility for instance as shown in Fig. 1. This receptacle 56 is provided with a cover 57 having integral ears 58 provided on its upper surface and extending rearwardly, said ears being pivotally connected at 59 with upright lugs 60 forming an integral part of the receptacle. A link 61 is pivotally connected at 62 with one of said lugs 60 and extends downwardly therefrom through an opening 63 formed in the plate 13 and top 11, the lower free end of said link 61 being preferably bent at right angles and located in close proximity to or in engagement with a member 64 disposed horizontally beneath the table 11 and pivotally connected at 65 with a lug 66 depending from the trough 14 shown best in Fig. 2. The said member 64 is continued downwardly from the pivot 65 in the form of a lever 67 which has its lower free end located near the floor upon which the support 10 stands and provided with a treadle or foot piece 68 as also shown in Fig. 2.

In actual practice the suction mechanism connected with the tube 16 is operated to produce a continuous suction therein in any usual and well known way. Thus as soon as the valve 17 is swung to an open position, which is done by swinging the lever 20 toward the rear through the medium of the pedal or foot piece 23 which causes a rotation of the angle rod 18 in the boss 19, this suction effect will be communicated to the trough 14 and will in consequence be effective through the slits 33 and apertures 31. If a leaf of tobacco or wrapper is now placed over the slits 33 and turned downwardly over the upper edge of the metal strip 28 over the apertures 31, said leaf will be firmly held in position by the suction at the slits 33 and apertures 31 and will be sharply creased along said upper edge of the strip 28. The arm 34 is now swung in a horizontal plane by means of the handle 36, whereby the roller 53 is carried along and its surface 54 caused to travel along the leaf or wrapper at the upper edge of the strip 28. During this actuation of the arm 34 the said roller is at all times held in engagement with said edge by one or the other of said springs 48, this depending on the direction of movement of said arm, and under the influence of said springs closely follows the said edge no matter what shape the latter may have, owing to the flexible connection of the member 46 with said arm 34. As the surface 54 of the roller 53 thus travels over the leaf or wrapper the latter is cut in two along the line of the crease, the roller and strip 28 coöperating to act as cutting means and the shape of the upper edge of the strip predetermining the shape of the cut and consequently the shape of the one edge of each cut section. The valve 17 may now be closed by a reverse actuation of the lever 20 through the medium of the pedal 23 which operation cuts off the slits 33 and apertures 31 from the effects of the suction and permits the cut sections of the tobacco leaf or wrapper to be readily removed and either used at once or stored for instance in the container 55. Any number of tobacco leaves may thus be successively cut to provide a supply of wrappers by simply placing each successive leaf in position over the slots 33 and apertures 31, opening the valve 17 as described, and then operating the arm 34 in one direction or the other to cause the surface 54 of the roller 53 to pass along the upper edge of the strip 28.

After a supply of wrappers has been prepared or after an individual leaf has been cut as set forth, the front section 25 of the suction table may be utilized as a rolling table on which to apply the wrapper to the bunch, and the suction effective at the slits 33 or rather the ends thereof which terminate at the upper surface of said section 25 may be utilized to hold the wrapper in position during this operation, thus leaving both hands of the operator free to apply either a right or left hand wrapper. Owing to the fact that the wrapper, in this case is held only along one edge portion, with all of that portion thereof in front of the slits 33 free from the effects of said suction the wrapper may be freely picked up and peeled from the table as it is rolled about the bunch. The wrapper is thus held under a tension and perfectly smooth during the wrapping operation and requires no manual smoothing or spreading out on the part of the operator, which results in even and uniform application of successive wrappers in an efficient manner with a minimum of effort and labor.

If paste is desired from the container 56 for the purpose of pasting the final end of the wrapper to form the point of the cigar, the treadle or foot piece 68 is pressed rearwardly by a foot of the operator which causes the lever 67 to be pivotally swung toward the rear. The movement of said lever 67 raises the member 64 and also raises the link 61 whereby the cover 57 of the paste receptacle 56 is swung to an open position, for instance as indicated by dotted lines in Fig. 3, and the paste in said container is exposed. As soon as the operator has secured the desired supply of paste, usually upon a finger, the pressure of the foot is removed from the treadle 68 whereupon the parts resume their initial positions under the influence of gravity and the cover 57 returns to its closed position. It will thus be seen that with this arrangement the paste is exposed only during the time it is actually needed and at all other times is covered and protected whereby evaporation and solidifying of the paste are prevented and contamination thereof by dirt and other foreign matter is reduced to a minimum.

With my improved construction, the leaf is firmly held during cutting and is sharply creased along the cutting line whereby tearing of the leaf due to dull and ineffective cutting means is avoided and an absolutely clean cut is at all times assured. The shape of the cut may be readily accommodated to any special or desired purpose by simply altering the form of the opposed surfaces of the sections 25 and 26 which always predetermines the position occupied by the metal strip 28 in the operative condition of the apparatus. The wrapper or leaf may thus always be cut in the most economical way and in a manner best suited for each individual type of cigar. At the same time the apparatus provides an efficient rolling table whereby a maximum of efficiency may be obtained even with comparatively unskilled operators and further includes a paste arrangement which always maintains the paste in a condition of maximum usefulness.

My apparatus is simple in construction, easy to maintain in an operative condition and is inexpensive to produce and to operate.

Various changes in the specific form shown and described may be made within the scope of the claims without departing from the spirit of my invention.

I claim:

1. In a cigar maker's apparatus, a support, a member carried by said support and having apertures terminating in a horizontal and a vertical face, a connection from said member to a suction producing means, means in surface engagement with said vertical face and extending over said apertures, said means having reduced openings in registry with said apertures and fastening means for securing said first means in position.

2. In a cigar maker's apparatus, a support, a suction table carried thereby and comprising a front section and a rear section, said rear section being lower than said front section whereby a vertical surface is formed at an intermediate portion of said table, said front section being provided with suction openings terminating in its upper surface and in said vertical surface, a flexible strip located between said table sections in surface engagement with said vertical surface and provided with suction apertures communicating with said suction openings, a cutting roller adapted to travel along the upper edge of said flexible strip, an arm for actuating said roller movable in a horizontal plane, a flexible connection between said arm and roller whereby the latter follows said edge and springs whereby said roller is maintained in contact with said edge at all times during movements of said arm in opposite directions.

3. In a cigar maker's apparatus, a support, a suction table carried thereby and comprising a front section and a rear section, said rear section being lower than said front section whereby a vertical surface is formed at an intermediate portion of said table, said front section being provided with suction openings terminating in its upper surface and in said vertical surface, a flexible strip located between said table sections in surface engagement with said vertical surface and provided with suction apertures communicating with said suction openings, means for detachably securing said sections together and for clamping said strip between the same, a cutting roller having a tapered surface adapted to travel along the upper edge of said flexible strip, a member carrying said roller, an arm pivotally movable across the rear lower section of said table, a pivotal connection between said arm and member and springs connected with said member and said arm whereby said roller is maintained in contact with said upper edge of said strip at all times during movements of said arm in opposite directions.

4. In a cigar maker's apparatus a support, a top carried by said support and provided with an aperture extending vertically therethrough, a plate carried by said top and provided in its upper surface with a recess, an upwardly open trough depending from said plate through said aperture, a connection from said trough to a suction producing means, a suction table in said plate recess and comprising a front section and a rear section lower than said front section, said sections being formed with shaped opposed surfaces whereby a shaped upright surface is formed at an intermediate point of said table, said front section having a series of slits terminating in its upper surface and in said vertical surface and communicating with said trough, a flexible strip located between said sections in surface engagement with said vertical surface and provided with suction apertures communicating with said slits, means for detachably connecting said sections together and for clamping said flexible strip therebetween, an actuating arm pivotally movable across the rear section of said suction table, a member pivotally connected with said arm and normally extending beyond the same, a cutting roller carried by said member and having a tapered portion adapted to travel along the upper edge of said strip, lugs extending in diametrically opposite directions from said member and springs connected with said lugs and with said arm whereby said cutting roller is caused to follow the upper edge of said strip and is maintained in contact therewith at all times during movements of said arm in opposite directions.

In testimony whereof I have hereunto set my hand.

OSCAR HAMMERSTEIN.

Copies of this patent may be obtained for five cents each, by addressing the "Commissioner of Patents, Washington, D. C."